United States Patent [19]

Muchmore et al.

[11] 4,205,626
[45] Jun. 3, 1980

[54] LARVAL TABLE

[75] Inventors: Bruce Muchmore, Tuxedo; Dan Ostrye, Goshen, both of N.Y.

[73] Assignee: Ecological Analysts, Inc., Middletown, N.Y.

[21] Appl. No.: 878,356

[22] Filed: Feb. 16, 1978

[51] Int. Cl.² .................... A01K 61/00; A01K 79/00; G01N 1/10
[52] U.S. Cl. .......................................... 119/3; 43/6.5; 73/421 R
[58] Field of Search .................. 119/3, 2, 4; 209/932; 43/7, 6.5; 73/421 R; 210/154

[56] References Cited

U.S. PATENT DOCUMENTS

| 6,621 | 7/1849 | Mulhern . | |
|---|---|---|---|
| 3,096,600 | 7/1963 | Gwyther | 119/3 X |
| 3,166,043 | 1/1965 | Castillo | 119/3 |
| 3,900,982 | 8/1975 | Gale | 43/7 |
| 4,046,996 | 9/1977 | Williams et al. | 119/3 |
| 4,117,726 | 10/1978 | McGroddy | 73/421 R |

OTHER PUBLICATIONS

P. M. McGroddy & R. L. Wyman, Journal of the Fisheries, vol. 34, Apr. 1977, pp. 571-574.

Primary Examiner—Hugh R. Chamblee
Attorney, Agent, or Firm—Jones, Tullar & Cooper

[57] ABSTRACT

A larval table for the collection of the early life stages of fish; i.e., eggs, larvae and juveniles as well as invertebrate macrozooplankton is disclosed. The larval table assembly includes a head or water delivery module, two or more screen separation modules, and a collection box module and concentration receptacle. The larval table is utilized in the collection of specimens where it is desired to recover the specimens alive. This is accomplished by reducing the flow velocity of the specimen carrying liquid which flows through the larval table. In addition, the collection box module and concentration receptacle eliminate the need for manual removal of the specimens from the larval table. The modular arrangement of the larval table allows modification of the table to accommodate varying flow rates of liquid to be sampled by adding additional screen separation modules, as needed.

7 Claims, 7 Drawing Figures

FIG. 3
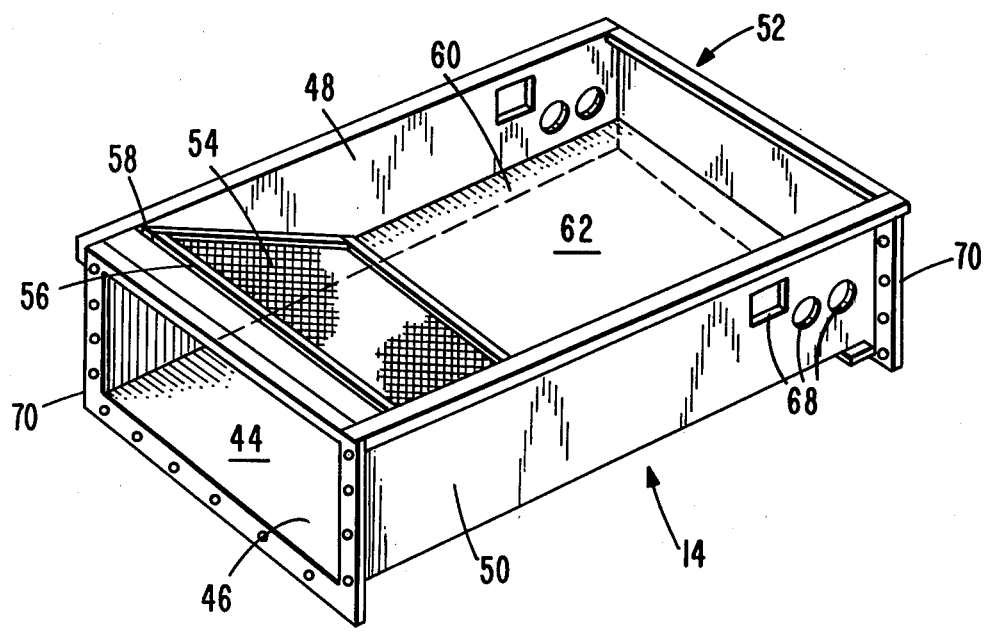
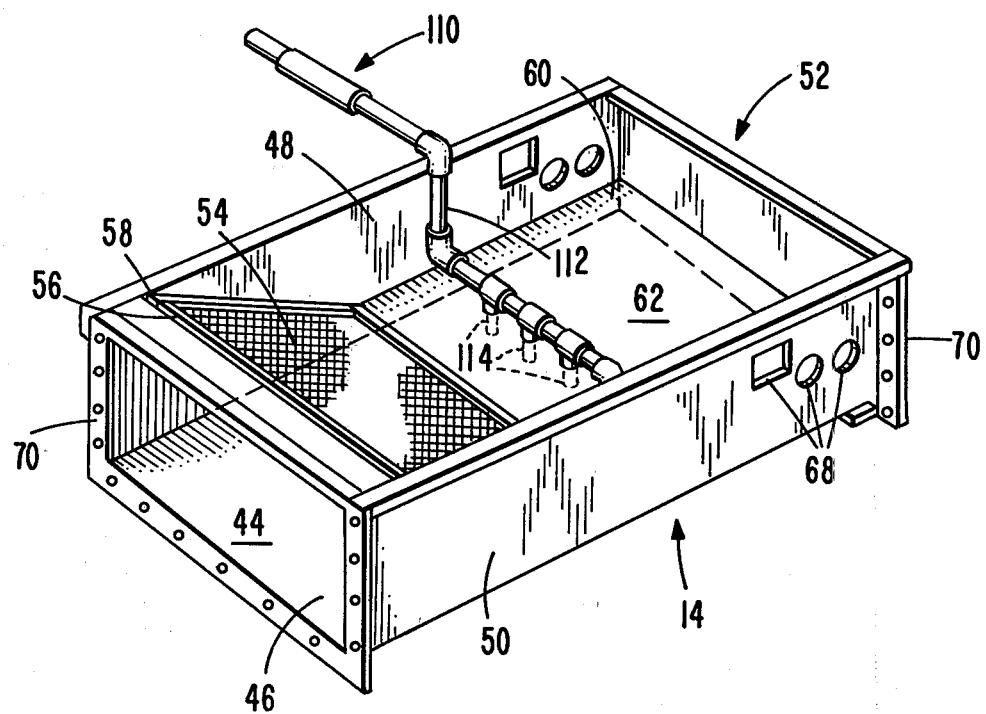
FIG. 4

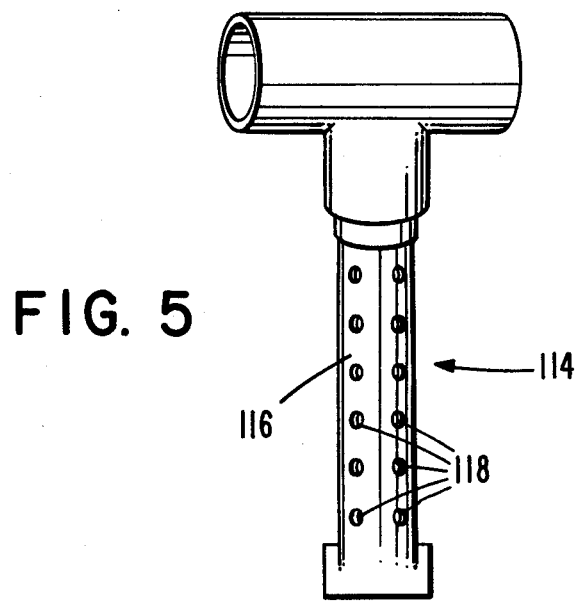
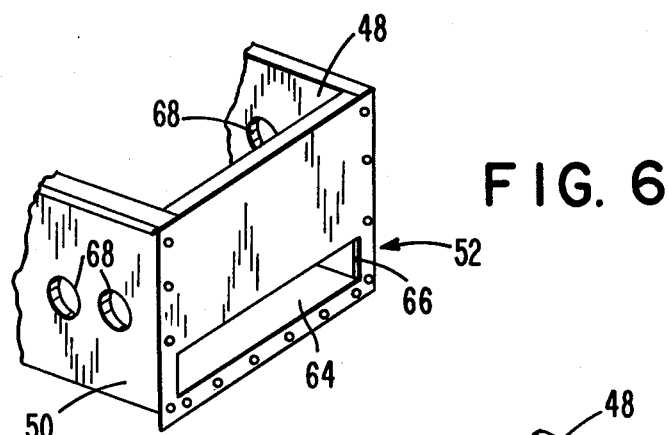
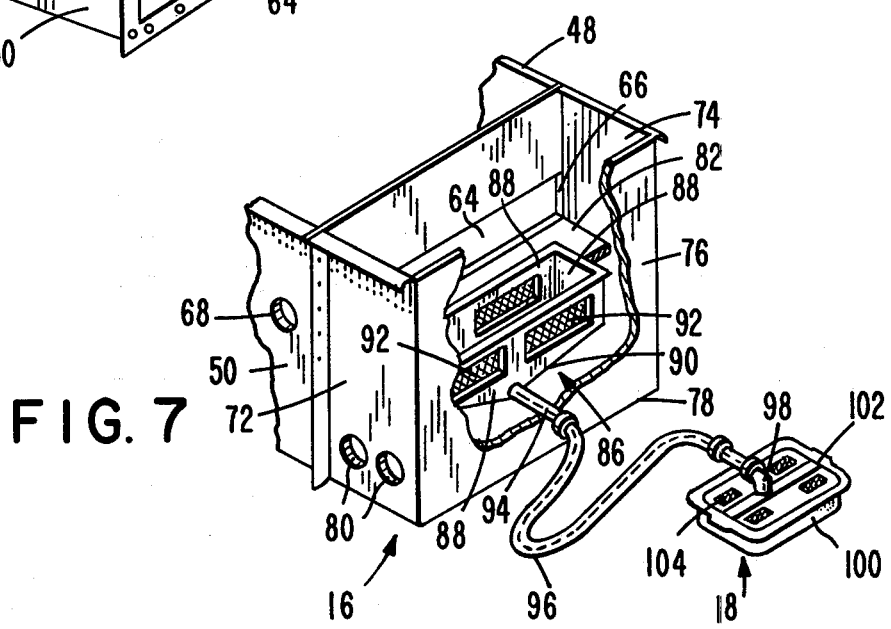

LARVAL TABLE

FIELD OF THE INVENTION

The present invention is directed generally to a device for separating specimens of fish larvae and the like from water, and for collecting and concentrating the separated larvae. More particularly, the present invention is directed to a specimen separating device, hereinafter referred to as a larval table, which is of modular construction. Most specifically, the present invention is directed to a larval table having several modular screen sections which may be interconnected and which may be joined to a collection box and concentration receptacle for collection of the specimens without manual handling of the fish.

A plurality of generally rectangular modules are secured together to form the larval table. A head module receives the liquid and several screen modules partially separate the fish from the water. The fish are then fed into a collection box module and from there into a concentration receptacle which can be transported back to the laboratory for analysis. The screen modules include inclined screens and separate flow channels for the water, which has been separated from the specimens and the specimens themselves. The larval table functions to reduce flow velocity of the water so the specimens can be collected alive and in good condition.

DESCRIPTION OF THE PRIOR ART

In an attempt to ascertain the effects on entrained organisms such as fish carried in water which is used in industrial processes such as cooling water for an electric utility plant, it has become necessary to obtain an accurate sample of the eggs, larvae and juvenile fish in the liquid before and after its use. The increase in nonviable specimens after use of the liquid is indicative of the ecological effect of the water user. A problem with past means for obtaining specimens, however, has been one of killing the specimens during the collection process itself. The effects of the industrial water user on the specimens in the water can thus not be accurately ascertained since the increase in nonviable specimens after use of the water cannot be ascribed only to the plant using the water but also to the capturing and separation of the specimens from the water.

Initially, specimens were separated and collected by nets which were either placed in the water just before and after the water user, or were towed by boats in the water supply. These collection methods and apparatus were not particularly successful because of the high rate of mutilation or death caused to the specimens by the sampling process.

A larval table, which is generally similar to the larval table of the present invention, is discussed in an article entitled "Efficiency of Nets and a New Device for Sampling Living Fish Larvae" by P. M. McGroddy and R. L. Wyman, J. Fish. Res. Board Can. 34:-571-574. The larval table set forth in this article, while superior to the prior nets and the like, has several shortcomings which result in the death of some of the specimens during the sampling of the fish larvae. The larval table presented in the McGroddy and Wyman article utilizes only one separating screen, requires manual removal of the collected specimens from the apparatus, is not modular, and is accordingly difficult to transport and store.

SUMMARY OF THE INVENTION

It is an object of the present invention to provide an improved larval table.

Another object of the present invention is to provide a larval table which is modular.

A further object of the present invention is to provide a larval table having a plurality of screen sections for separation of specimens from water.

Still another object of the present invention is to provide a larval table joined to a collection box module and a concentration receptacle for receipt of the specimens.

Still a further object of the present invention is to provide a larval table including means to modify the specimen containing liquid during separation.

The larval table assembly in accordance with the present invention is of modular construction and includes a head or water delivery module, at least two screen separation modules, and a collection box module and concentration receptacle. Water, which carries the specimens to be separated out, is pumped to the head module which is of increasing volume to decrease the velocity of the water. Each of the screen separation modules includes an inclined screen and two separate flow paths; one for the water which passes through the screen and a second for the specimens and water which do not pass through the screen. The flow of specimens and water from the first screen module is fed into the subsequent screen module or modules for further separation. From the last screen separation module, the specimens flow into the collection box and finally to the concentration receptacle which can then be returned to the laboratory for study.

In contrast with the prior larval table, the present invention provides a modular device in which several screen sections can be added to accommodate greater water flows. In addition, the collection box and concentration receptacle of the present invention provide for the separation and collection of the specimens in a container with no manual handling. In the present invention, the screens in the screen separation modules can be removed as desired, or necessary, to change mesh sizes, or for cleaning or repair.

The collection box module receives the flow of specimens and water from the last screen separation module of the larval table and provides a secondary concentration by removal of additional water. The final concentration is carried out in the concentration receptacle which is detachable from the collection box. The specimens collected in the concentration receptacle can be transported to a laboratory or the like or can be stored in the receptacle, if necessary.

BRIEF DESCRIPTION OF THE DRAWINGS

While the novel features of the larval table in accordance with the present invention are set forth with particularity in the appended claims, a full and complete understanding of the invention may be had from the description of a preferred embodiment set forth hereinafter and as may be seen in the accompanying drawings in which:

FIG. 3 is a perspective view of a screen separation module in accordance with the present invention;

FIG. 4 is a perspective view of a screen separation module and including a water inlet manifold for the flow path of the specimens;

FIG. 5 is an elevation view of a diffuser nozzle for use in the inlet manifold shown in FIG. 4;

FIG. 6 is a perspective view of the discharge portion of a screen separation module of the present invention; and FIG. 7 is a perspective view of the collection box module and the concentration receptacle of the present invention.

DESCRIPTION OF A PREFERRED EMBODIMENT

Figure 1:
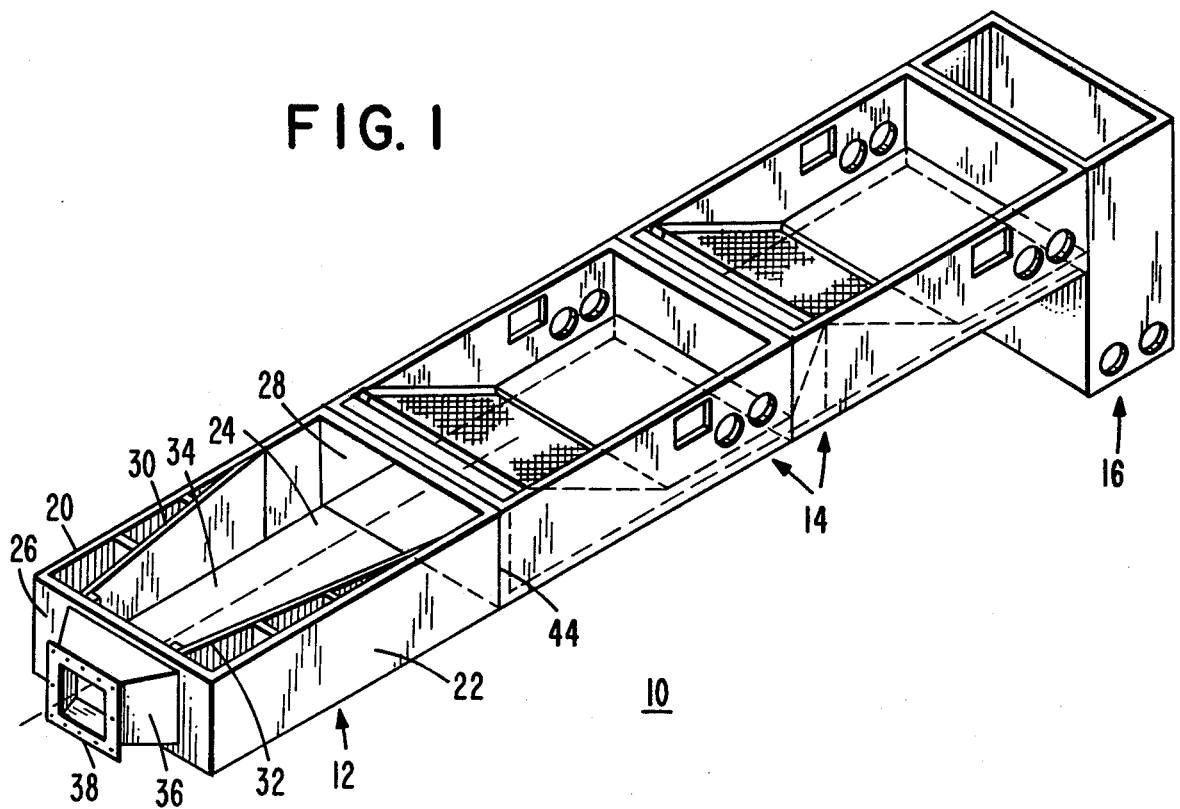
FIG. 1 is a perspective view of a preferred embodiment of a larval table in accordance with the present invention.

Turning now to FIG. 1, there may be seen generally at 10 an improved larval table assembly in accordance with the present invention. Table 10 is comprised of a number of interconnected modules including a head or water delivery module 12, at least first and second screen separation modules 14, and a collection box module 16 which includes a concentration receptacle 18, as may be seen in FIG. 7. The improved larval table 10 is structured generally of aluminum or fiberglass so as to be substantially unaffected by the water, entrained specimens, and possible chemicals which pass through the apparatus. It will be understood that other materials could be used in the improved larval table if desired so long as they are not affected by the water and do not affect the specimens.

Figure 2:
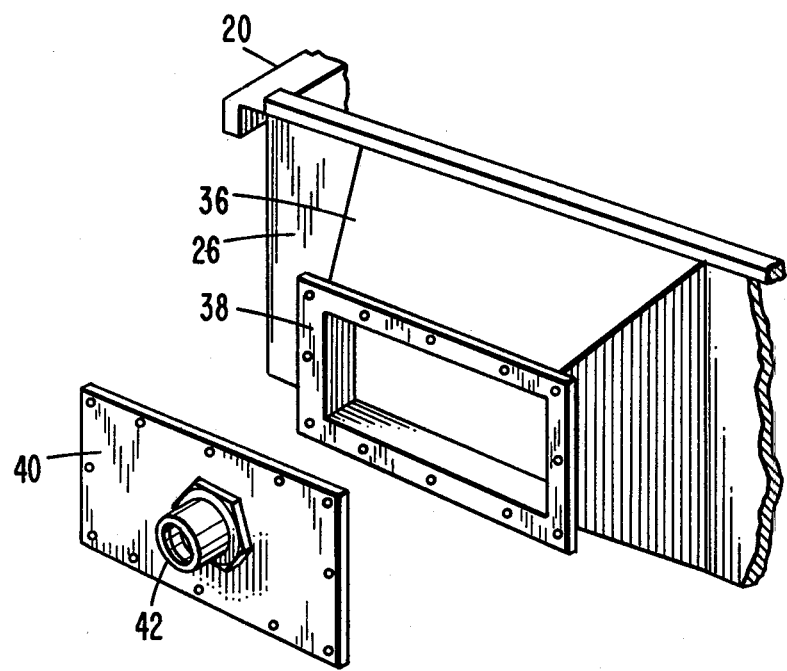
FIG. 2 is a perspective view of the entrance portion of the larval table of the present invention.

Referring again to FIG. 1, head or water delivery module 12 may be seen as being generally in the shape of a rectangular chute having side walls 20, 22, a base or bottom 24, an inlet wall 26 and an outlet opening 28. A pair of diverging interior walls 30, 32 extend away from inlet wall 26 and serve to define an inlet flow chamber 34 of increasing volume. As may be seen in FIGS. 1 and 2, a trapezoidal box 36 is secured to the exterior side of inlet wall 26 of head module 12. Trapezoidal box 36 is provided with a mounting flange 38 which is intended to receive adaptor plates such as plate 40, with each plate 40 having a certain diameter hose connection 42. The flow into the larval table can thus be controlled to an extent by the choice of adaptor plate 40 and its hose connection 42.

As may also be seen in FIG. 1, the water delivery module has its outlet opening 28 connected to an inlet portion 44 of a first screen separation module 14 which may be seen more clearly in FIG. 3. Each screen separation module 14 is also a generally rectangular chute having a bottom 46 and a pair of upstanding side walls 48, 50. An outlet wall 52 may be seen more clearly in FIG. 6 and will be discussed in detail hereinafter. An inclined screen 54 is inclined at an angle from the vertical and slopes downwardly and away from the inlet 44 of each screen separation module 14. Screen 54 is secured to a frame 56 which is positioned in tracks 58 that extend diagonally downwardly on the side walls 48, 50 of each screen separation module 14. A generally horizontal intermediate partition or false bottom 60 is secured to the side walls 48, 50 and extends rearwardly from the lower terminus of screen 54 to the outlet wall 52 of each screen separation module 14. False bottom 60 serves to divide the separation module 14 into two flow chambers, an upper chamber 62 and a lower chamber 64 which terminates in an outlet opening 66 in outlet wall 52 as may be seen in FIG. 6. As may also be seen in FIGS. 1, 3 and 6, each screen separation module includes a plurality of drain openings 68 which are placed in side walls 48 and 50 in the upper flow chamber 62. As may further be seen in FIGS. 3 and 6, each screen separation module further includes suitable flanges 70 around the inlet 44 and outlet 52 to facilitate interconnections of the screen separation modules 14 with each other, with the water delivery module, and with the collection box module. Although not specifically shown, it will be understood that any suitable means can be provided to secure the various modules together. Screws, nuts and bolts, pins, hooks, clamps and the like may be used so long as the modules are secured together in a leakproof manner.

Referring again to FIG. 1, in use, the water delivery module 12 is secured to a first separation module 14 which is connected to a second separation module 14 which is, in turn, connected to the collection box module 16 whose structure will be more fully discussed subsequently. A source for supplying water and entrained specimens is connected to the hose connection 42 on the trapezoidal box 40 and liquid with entrained materials flows into the flow chamber 34 in the water delivery module where the volume of the chamber increases so that the flow rate is reduced. The liquid and entrained specimens pass through the water delivery module 12 and enter the first screen separation module 14. Most of the water and entrained specimens contact the inclined screen 54 and, in a first separation step, the water passes through the screen, into the upper flow chamber 62 above the false bottom 60 and out the several drain openings 68. The specimens which have been separated out, together with some of the water, pass through the lower flow chamber 64 below the false bottom 60 and out through the outlet 66 in the first screen separation module 14. Since the first screen separation module 14 is secured to at least a second similar module 14, as may be seen in FIG. 1, the specimens and remaining liquid exiting from outlet 66 in the first separation module 14 enter the inlet 44 of the second separation module, the inlet being of greater area than the preceding outlet. The flow rate is again reduced and further separation of liquid and specimens takes place. If desired, one or more additional screen separation modules can be added to the second separation module to further separate the liquid and entrained specimens.

Referring again to FIG. 1, it will be seen that the collection box module 16 is joined to the outlet end 52 of the last screen separation module 14. The collection box module 16 may be seen most clearly in FIG. 7 and includes a generally rectangular box having side walls 72 and 74, an end wall 76 and a bottom 78. Suitable drain openings 80 are provided in the side walls 72 and 74 of the collection box module 16 adjacent the bottom 78 of the box 16. An intermediate horizontal support baffle 82 extends across the interior of collection box module 16 at a level slightly below the outlet opening 64 from the last screen separation module 14. A screened trough 86 is supported by baffle 82 and includes four side walls 88 and a sloping bottom 90. A plurality of screen sections 92 are placed about the side walls 88 of the screened trough 86 and an outlet line 94 is located at the low point of the sloping bottom 90. The specimens and remaining liquid which exit from the last screen separation module 14 pass into the collection box module 16 and into the screened trough 86. Further separation occurs in trough 86 as the liquid passes out through the screens 92 and the drain openings 80 while the specimens sink to the bottom 90 and pass out through the outlet line 94.

As may further be seen in FIG. 7, the outlet line 94 is connected through a suitable flexible conduit 96 to an inlet 98 of the concentration receptacle 18. Concentration receptacle 18 is comprised of a pan 100 and a removable screened top 102 which has several screens 104 therein. The specimens and whatever remaining liquid may be associated with them are received in the collection receptacle 18. The water passes out through the screened top 102 and the specimens are concentrated in the pan 100. After a suitable length of time or after the flow of a certain volume of water, the concentration receptacle 18 can be detached from the flexible conduit 96 and returned to a laboratory for analysis. The specimens are not handled during the separation and can be stored in the concentration receptacle 18 until they can be analyzed.

For certain applications such as in-situ bioassay studies, the screen separation module 14 can be fitted with auxiliary devices to modify the condition of the water and specimens passing under the false bottom 60. As may be seen in FIG. 4, an auxiliary water flow system 110 may be provided. Auxiliary water flow system 110 includes suitable piping 112 which terminates in a plurality of diffuser nozzles 114 which pass through the false bottom 60 and into the lower flow chamber 64. A single diffuser nozzle 114 may be seen in FIG. 5 and consists of a section of pipe 116 having a plurality of apertures 118 for water passage. The auxiliary water flow system may be used, for example, to raise or lower the temperature for specimens passing through the larval table to simulate the effect and duration of thermal exposure of the specimens entrained in a power plant's heated effluent.

While a full and complete description of a larval table in accordance with the present invention has been set forth hereinabove, it will be obvious to one of skill in the art that a number of changes could be made without departing from the true spirit and scope of the invention. For example, the materials used for the larval table, the shape of the several modules, the means for securing the modules together, the mesh of the separating screen segments, the means for removably supporting the separation screens, and the like could be made without departing from the invention and accordingly, the invention is to be limited only by the appended claims.

We claim:

1. An improved larval table for the separation, concentration, and collection of specimens such as the early life stages of fish entrained in water, said larval table comprising:
    a water delivery module, said water delivery module receiving said specimens and water to be separated and having means to reduce the flow speed of said specimens and water;
    at least first and second screen separation modules, each of said screen separation modules including an inclined separation screen and first and second flow passages, said first screen separation module receiving said specimens and water from said water delivery module, a portion of the water passing through said inclined separation screen and into said first flow passage, said specimens and the remaining water passing through said second flow passage into said second screen separation module for further separation
    a collection box module, said collection box module receiving said specimens and any remaining water from said second flow passage of said second screen separation module to further separate said specimens and water, said collection box module including an intermediate horizontal support baffle extending into said collection box module adjacent the discharge of the specimens and water from said second flow passage of said second screen separation module, and a screened trough supported by said support baffle, said screened trough having sidewalls with screen sections and a sloping bottom, said screened trough receiving the specimens and water for performing the further separation of the specimens and water in said collection box module, said specimens being retained in said trough while the water passes through said screen sections and out through drain openings in said collection box module; and
    a concentration receptacle, said concentration receptacle receiving said further separated specimens from said screened trough of said collection box module and removing substantially any remaining water from said specimens whereby said specimens are separated from the water, are collected and concentrated.

2. The larval table of claim 1 further wherein said water delivery module receives said specimens and water to be separated through a trapezoidal box, said trapezoidal box including means to receive adaptor plates having differing sized hose connections whereby the flow of said specimens and water into said water delivery module may be varied by using different ones of said adaptor plates.

3. The larval table of claim 1 wherein said screened trough includes an outlet line which is joined to a flexible conduit for transferring said further separated specimens from said screened trough in said collection box module to said concentration receptacle.

4. The larval table of claim 1 further wherein said concentration receptacle is a pan having a removable screened top whereby said specimens and water enter said pan and the water flows out through said screened top with said specimens being retained in said pan.

5. A collection box and concentration receptacle for use in collecting and concentrating specimens such as the early life stages of fish entrained in water, the specimens having been partially separated from the water in a specimen separating device, said collection box and concentration receptacle comprising:
    a collection box module, said collection box module receiving the specimens partially separated from the water in the specimen separating device to further separate the specimens and water, said collection box module including an intermediate horizontal support baffle, said support baffle extending into said collection box module adjacent the discharge of the specimens and water from the outlet opening of the specimen separating device, and a screened trough supported by said support baffle, said screened trough having sidewalls with screen sections and a sloping bottom, said screened trough receiving the specimens and water for performing the further separation of the specimens and water in said collection box module, said specimens being retained in said trough while the water passes through said screen sections and out through drain openings in said collection box module; and a concentration receptacle, said concentration receptacle receiving the further separated specimens from said screened trough of said collection box module and removing substantially any remaining water from the specimens whereby the specimens are separated from the water, are collected and are concentrated.

6. The collection box module of claim 5 wherein said screened trough includes an outlet line which is joined to a flexible conduit for transferring said further separated specimens from said screened trough in said collection box module to said concentration receptacle.

7. The collection box and concentration receptacle of claim 7 further wherein said concentration receptacle is a pan having a removable screened top whereby the specimens and water from said collection box module enter said pan and the water flows out through said screened top with the specimens being retained in said pan.

* * * * *